(12) United States Patent
McConaughy et al.

(10) Patent No.: US 8,484,641 B2
(45) Date of Patent: Jul. 9, 2013

(54) IMPLEMENTING A VERSIONED VIRTUALIZED APPLICATION RUNTIME ENVIRONMENT

(75) Inventors: John M. McConaughy, Austin, TX (US); Marc J. Stephenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 12/834,475

(22) Filed: Jul. 12, 2010

(65) Prior Publication Data

US 2012/0011513 A1    Jan. 12, 2012

(51) Int. Cl.
G06F 9/46    (2006.01)

(52) U.S. Cl.
USPC .............................................. 718/100; 718/1

(58) Field of Classification Search
None
See application file for complete search history.

(56) References Cited

U.S. PATENT DOCUMENTS

| | | | |
|---|---|---|---|
| 6,732,211 B1 * | 5/2004 | Goyal et al. | 710/261 |
| 7,296,274 B2 | 11/2007 | Cohen et al. | |
| 7,437,766 B2 | 10/2008 | Cohen et al. | |
| 7,546,600 B2 | 6/2009 | Turner et al. | |
| 7,552,434 B2 | 6/2009 | Turner et al. | |
| 2004/0168173 A1 * | 8/2004 | Cohen et al. | 719/310 |
| 2005/0076237 A1 | 4/2005 | Cohen et al. | |
| 2005/0246708 A1 | 11/2005 | Turner et al. | |
| 2005/0251803 A1 | 11/2005 | Turner et al. | |
| 2006/0005003 A1 * | 1/2006 | Grobman | 713/2 |
| 2007/0061477 A1 | 3/2007 | Stoyanov et al. | |
| 2008/0082985 A1 | 4/2008 | Gagner et al. | |

OTHER PUBLICATIONS

Yu, Yang , "OS-level Virtualization and Its Applications", Dissertation, Stony Brook University, Dec. 2007.*
Pohlack, Martin , "The VELOX research project", http://blogs.amd.com/developer/category/amd-operating-system-research-center-osrc/ Obtained from internet (Jul. 8, 2010) Nov. 17, 2009 , pp. 1-3.
Yu, Yang , "OS-level Virtualization and Its Applications", *Dissertation, Stony Brook University*, Dec. 2007, p. 15-16 Obtained from internet (Jul. 8, 2010) http://www.ecsl.cs.sunysb.edu/tr/TR223.pdf Dec. 2007 , pp. 15-16.

* cited by examiner

*Primary Examiner* — Emerson Puente
*Assistant Examiner* — Sisley Kim
(74) *Attorney, Agent, or Firm* — DeLizio Gilliam, PLLC

(57) ABSTRACT

A workload partition, associated with a legacy operating system, is created on an instance of a base operating system implemented on a machine. The legacy operating system is an earlier version of the base operating system. An indication is detected to execute a first command associated with a process of the workload partition associated with the legacy operating system. It is determined that the first command associated with the process of the workload partition associated with the legacy operating system was overlaid with a reference to a runtime execution wrapper associated with the base operating system. The runtime execution wrapper is executed to access a runtime execution environment associated with the base operating system. The first command is executed using the runtime execution environment associated with the base operating system.

20 Claims, 6 Drawing Sheets

IMPLEMENTING A VERSIONED VIRTUALIZED APPLICATION RUNTIME ENVIRONMENT

BACKGROUND

Embodiments of the inventive subject matter generally relate to the field of operating systems, and, more particularly, to implementing a versioned virtualized application runtime environment.

Operating system virtualization is a technology which can divide a single host (e.g., computer, server, etc.), into multiple parts, or partitions, each running a separate instance, or image, of an operating system (OS). The instances of the operating systems are separate, or isolated, from each other in some ways. For example, the instances of the operating systems have separate file systems, separate users, separate applications, and separate processes. In other ways, however, the instances of the operating systems are not separate and can share some resources of the host. For example, the instances of the operating systems can share the memory, the kernel, the processors, the network cards, the hard drives, and/or other software, firmware, and/or hardware of the host. Thus, each instance of the operating system can look and feel like a separate server or machine from the point of view of its users. However, because the instances of the operating system share resources of the host, the instances of the operating systems are not actually separate devices. The instances of the operating system are commonly referred to as "virtual" or "virtualized" operating systems (virtual OS's). In similar contexts, virtualized operating systems are also referred to as virtual partitions, virtual machines, virtual environments, or virtual servers.

Virtual OS's can be implemented in different ways. One way is for an administrative user to create a logical partition (LPAR) on a host and install an instance of an operating system on the LPAR. The administrative user can create an LPAR by dividing a portion, or subset, of the host's hardware resources, such as processors, memory, and storage. The administrative user can isolate the LPAR from other LPARs running on the same device or machine. Specifically, the administrative user isolates the subset of the host's hardware resources from other subsets, so that multiple LPARs can run on the host, with each LPAR being operating independently of each other, as if each LPAR was a separate machine. The administrative user can install an instance of the operating system on an LPAR. The instance of the operating system can run its own applications in a way that is separate and isolated from any other LPAR. The number of LPARs that can be created on a host, however, depends on the number of resources that are available at the host. For example, to create an LPAR, an administrative user physically partitions a portion of the host's memory and assigns the portion of the host's memory to the LPAR. Because LPARs have separation at the hardware level, LPARs are very stable, can run different versions of an operating system, and provide a very high degree of isolation from other LPARs.

A different way to create a virtual OS is to form a workload partition (WPAR). WPARs were introduced in the IBM® AIX® operating system. WPARs are a software implementation of operating system virtualization. More specifically, WPARs are software partitions that are created from, run under, and share the resources of a managing instance of the operations system (OS). Typically, the WPARs and the managing instance share an identical operating system (e.g., identical version, identical patches, identical tuning options, etc.). The managing instance of the OS is referred to as a base environment or the base OS. Multiple WPARs can run on a single managing resource (e.g., on a single machine or on a single LPAR). An administrative user does not need to physically divide up portions of the host's hardware to create a WPAR. Rather, the administrative user runs a command to generate a WPAR and the base OS creates and manages the WPAR as a software partition.

SUMMARY

Embodiments of the inventive subject matter include a method for implementing workload partitions. A workload partition, associated with a legacy operating system, is created on an instance of a base operating system implemented on a machine. The legacy operating system is an earlier version of the base operating system. An indication is detected to execute a first command associated with a process of the workload partition associated with the legacy operating system. It is determined that the first command associated with the process of the workload partition associated with the legacy operating system was overlaid with a reference to a runtime execution wrapper associated with the base operating system. The runtime execution wrapper is executed to access a runtime execution environment associated with the base operating system. The first command is executed using the runtime execution environment associated with the base operating system.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to implementing workload partitions within a computer system executing an IBM® Advanced Interactive eXecutive (AIX®) operating system, in other embodiments workload partitions can also be implemented in computer systems executing other types of operating systems (e.g., Solaris™, Linux®, etc.) and/or across other implementations of operating system level virtualization (e.g., across containers/zones, virtual environments (VEs), virtual private servers (VPS), etc.) or across individual applications. In other instances, well-known instruction instances, protocols, structures and techniques have not been shown in detail in order not to obfuscate the description.

Organizations employ operating system virtualization or workload partitions (WPARs) to organize and isolate workloads in accordance with business requirements, organizational guidelines, etc., while efficiently utilizing available equipment. For instance, an administrator can create different WPARs for a marketing department database and associated applications ("marketing database workload"), an accounting department database and associated applications ("accounting database workload"), and legal department electronic mail server ("legal e-mail workload"). Instead of using 3 different servers, the resources of a single server can be used to satisfy the needs of the 3 workloads. Each WPAR presents to the respective hosted workload (i.e., processes, application(s) of the workload) as an instance of an operating system with its own namespace and process environment.

Typically, systems are limited to creating WPARs that are associated with the same version of the main or base operating system that is executed in the system (e.g., within a single host computer system, or within a single LPAR). In other words, the operating system environment of the WPAR is limited to the version of the base operating system of the underlying kernel and device driver software of the system. This limits the flexibility of WPARs. In some embodiment, a mechanism can be implemented to create WPARs associated with an earlier version of the base operating system that is executed on the system. WPARs associated with an earlier version of the base OS can be referred to as "versioned WPARs". Furthermore, functionally can be implemented to modify the default library path in the WPAR and perform other operations to allow certain commands in the WPAR that need to access the base operating system environment to execute.

Figure 1:
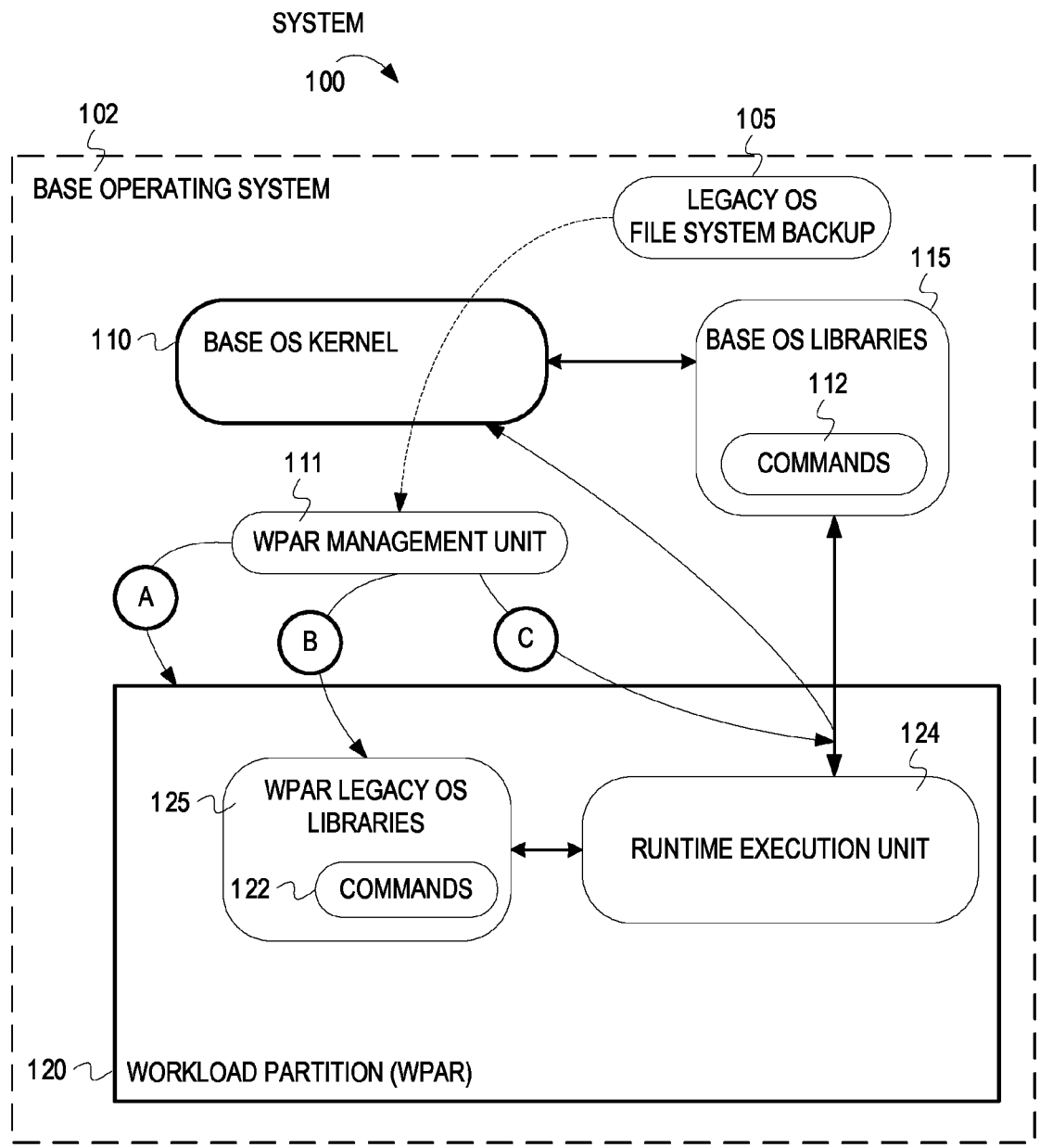
FIG. 1 is an example block diagram illustrating a mechanism for creating a WPAR on a system running a different version of the operating system.

FIG. 1 is an example block diagram illustrating a mechanism for creating a WPAR on a system running a different version of the operating system. In the example shown in FIG. 1, a system 100 is running a base operating system 102. The system 100 can be a single host computer system, or a single LPAR within a host computer system with a plurality of LPARs. The base operating system (OS) 102 comprises a kernel 110, a WPAR management unit 111, base OS libraries 115, base OS commands 112, and the legacy OS file system backup 105. The legacy OS file system backup 105 is a file that includes a backup of the root file systems of the legacy OS, which is an earlier version of the base OS 102. For example, the base OS 102 can be the AIX OS version 7.1, and the legacy OS can be the AIX OS version 5.2. It is noted, however, that the base OS 102 and the legacy OS can be different versions of other operating systems (e.g., different versions of the Solaris operating system). The WPAR management unit 111 can create and manage WPARs within the base OS 102. In some embodiments, the WPAR management unit 111 can create WPARs associated with the base OS 102, and WPARs associated with an earlier version of the base OS 102 (e.g., the legacy OS). For example, the WPAR management unit 111 can create the WPAR 120, associated with the legacy OS, on the system 100 executing the base OS 102, as will be further described below. WPARs are software partitions at the OS-level that provide a virtualized runtime environment for applications. WPARs provide the applications with isolation from the rest of the system 100 and also provide improvements in workload and resource management. In one embodiment, each WPAR comprises all the user level code, including commands and libraries, that interact with the kernel level code (i.e., the kernel 110 of the base OS 102), which is common to all the WPARs that are created on top of the base OS 102. For example, as shown in FIG. 1, the WPAR 120 can include the legacy OS libraries 125 and commands 122. The WPAR 120 can also include a runtime execution unit 124 for establishing the execution path for commands, and executing the commands for processes that are running within the WPAR, as will be further described below with reference to FIGS. 2-5.

In some embodiments, the WPAR management unit 111 creates the WPAR 120, associated with the legacy OS (i.e., an earlier version of the base OS 102), in the system 100 that executes the base OS 102 (Stage A). For instance, in one example, a system administrator enters a command for the system 100 to create a WPAR that includes a virtualized runtime environment associated with the legacy OS. In response to detecting the command, the WPAR management unit 111 creates the WPAR 120 by first creating a set of file systems and then populating the set of file systems with the content of the legacy OS file system backup 105. For example, the WPAR management unit 111 can create the virtualized runtime environment of the WPAR 120 by populating the file systems with the legacy OS libraries 125 and commands 122 (which are stored in the legacy OS file system backup 105).

The WPAR management unit 111 modifies entries in the legacy OS file systems of the WPAR 120 for one or more of the commands 122 that need to be executed using the base OS environment (Stage B). Most of the commands 122 in the legacy OS file systems depend on system call kernel interfaces that do not change from one version of the operating system to the other. However, one or more of the commands 122 may have dependencies on the content of the base OS kernel 110, on interfaces from kernel extensions, and/or on other kernel-related information that does change from one version of the operating system to the other. In some embodiments, for these commands 122 that have dependences on the base OS kernel 110, the WPAR management unit 111 can modify the corresponding entries in the legacy OS file systems by overlaying the executables associated with the commands 122 with a symbolic link to a base OS runtime execution wrapper. The base OS runtime execution wrapper can be executed to generate a special type of system call to the base OS runtime execution interface. The base OS runtime execution interface can provide access to the base OS libraries 115, commands 112, and other kernel-related information associated with the base OS environment that is needed to execute the command, as will be further describe below with reference to FIGS. 2-5. Furthermore, in some cases, there may be minor changes (from one version of the operation system to the other) in some of the semantics and/or in the kernel interfaces associated with some system calls between the user space and the kernel space. In some embodiments, when the commands do not need to execute via the base OS runtime interface, the base OS kernel 110 can include a kernel compatibility layer that resolves any minor changes or other minor compatibility issues associated with these system calls to obtain the desired legacy OS behavior, as will be further described below with reference to FIG. 3.

The WPAR management unit 111 defines, within the WPAR runtime execution environment, a selectable library path to the base OS kernel 110 and libraries 115 ("base OS library path") (Stage C). In some embodiments, the selectable base OS library path can be selected by the base OS runtime execution wrapper and utilized by the base OS runtime execution interface to execute the commands 122 that have dependencies on the base OS environment for execution purposes, as will be further described below with reference to FIGS. 2-5. In one example, the WPAR management unit 111 can define a selectable directory path where the loader can select the base OS libraries 115 during execution. By defining this selectable base OS library path, the WPAR runtime execution environment can select either the legacy OS libraries 125 or the base OS libraries 115 during execution. In one specific example, for a base AIX OS, the WPAR may select either a "/usr/lib" file system that can be used to access the legacy OS libraries, or a "/nre/usr/lib" file system that can be used to access the base OS libraries.

Figure 2:
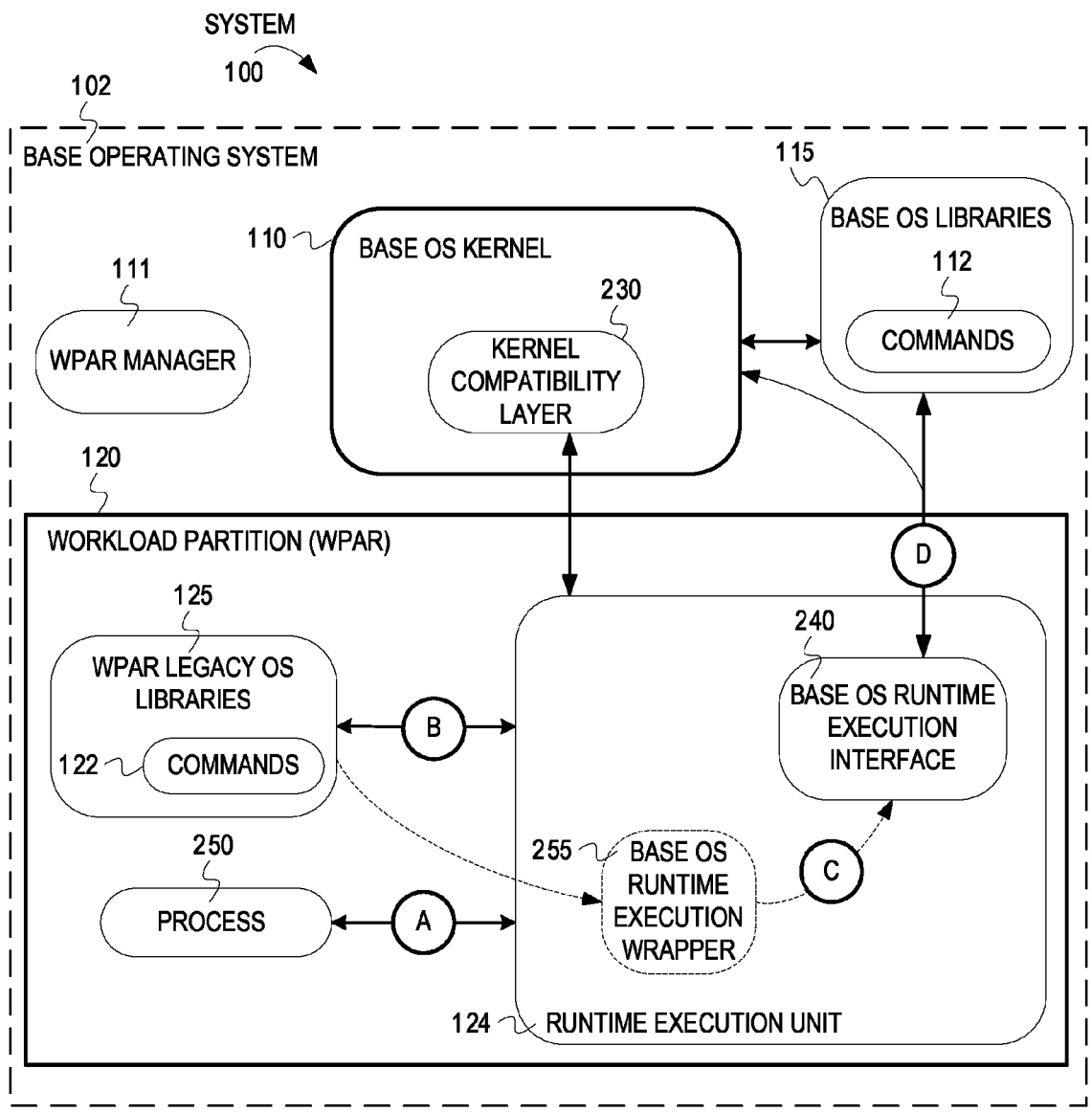
FIG. 2 is an example block diagram illustrating a mechanism for executing a command called by a process running within a WPAR of the system running a different version of the operating system.

FIG. 2 is an example block diagram illustrating a mechanism for executing a command called by a process running within a WPAR of the system 100 running a different version of the operating system. For example, as described above, even though the system 100 is running the base OS 102, the WPAR management unit 111 can create the WPAR 120 that is associated with an earlier version of the base OS 102 (i.e., the legacy OS).

In one implementation, after creating the WPAR 120, a process 250 that is running within the WPAR 120 can make a system call to execute a first command 122. The runtime execution unit 124 associated with the WPAR 120 can detect the system call from the process 250 to execute the first command 122 (Stage A).

The runtime execution unit 124 can determine that the first command 122 was overlaid when the WPAR 120 was created so that the first command is executed in the base OS environment (Stage B). For example, after detecting the system call to execute the first command 122, the runtime execution unit 124 can access the file corresponding to the first command 122 in the WPAR legacy OS file systems. The runtime execution unit 124 can access the WPAR legacy OS file systems to determine whether the executable file associated with the first command 122 was overlaid when the WPAR was created. As described above in FIG. 1, when the WPAR 120 is created, the WPAR management unit 111 modifies the entries in the legacy OS file systems associated with each command that has dependencies on the base OS environment (i.e., base OS kernel 110), and therefore needs to be executed using the base OS environment. In one example, the WPAR management unit 111 overlays the binary executable associated with the command with a symbolic link to the base OS runtime execution wrapper 255. Therefore, when a process calls the command, the runtime execution unit 124 follows the symbolic link to load and execute the base OS runtime execution wrapper 255, instead of loading and executing the binary executable associated with the command. It is noted, however, that in other embodiments other types of references or links can be used to specify the location of the executables associated with the base OS runtime execution wrapper 255.

When the runtime execution unit 124 loads and executes the base OS runtime execution wrapper 255, the base OS runtime execution wrapper 255 modifies the default library path associated with the WPAR to allow the first command 122 to be executed using the base OS environment (e.g., the base OS kernel 110 and libraries 115) (Stage C). For example, instead of following the default library path to access the legacy OS libraries 125, loading the binary executable associated with the command, and executing the command, the runtime execution unit 124 follows the selectable base OS library path, which was defined when the WPAR 120 was created, for accessing the base OS kernel 110 and libraries 115. In one implementation, the runtime execution unit 124 executing the base OS runtime execution wrapper 255 dynamically selects the base OS library path (instead of the default library path) to execute the first command 122. When the runtime execution unit 124 executes the base OS runtime execution wrapper 255, the base OS runtime execution wrapper 255 selects the base OS library path to access base OS kernel 110 and libraries 115 needed to execute the first command 122, as will be further described below with reference to FIGS. 4-5. Furthermore, the base OS runtime execution wrapper 255 performs a system call to the base OS runtime execution interface 240. The base OS runtime execution interface 240 is a special type of system call that can be used to access the base OS environment (e.g., the base OS kernel 110 and libraries 115) to execute the first command 122. The base OS runtime execution wrapper 255 also determines the name associated with the first command 122, and provides the name to the base OS runtime execution interface 240, so that the base OS runtime execution interface 240 can identify and access the corresponding command and other kernel-related information in the base OS environment.

The base OS runtime execution interface 240 accesses the base OS environment and executes the first command 122 using the base OS environment (Stage D). For example, the base OS runtime execution interface 240 loads the executable associated with the first command 122 from the base OS file systems and uses the selected base OS library path to load the base OS libraries 115 needed to execute the first command 122 in the base OS environment. In some embodiments, when the base OS runtime execution interface 240 is called, the base OS runtime execution interface 240 can immediately set a flag (or other type of indicator) within the process 250 that is running within the WPAR 120 to indicate the first command 122 should be executed using the base OS environment (for future system calls), as will be described below with reference to FIGS. 4-5. Furthermore, in some embodiments, when the base OS runtime execution interface 240 is called, the base OS runtime execution interface 240 can determine whether the process 250 associated with the first command 122 is process with raised privileges. If the process 250 is a process with raised privileges, the base OS runtime execution interface re-selects the base OS library path to execute the first command 122, as will be described below with reference to FIGS. 4-5.

In some embodiments, as shown in FIG. 2, the base OS kernel 110 can also implement a kernel compatibility layer 230 that provides the semantic and syntactic interface for system calls from processes running within the WPAR 120 for that particular version of the operating system (e.g., the legacy OS). In other words, the kernel compatibility layer 230 can resolve minor semantic and syntactic differences (from one version of the operation system to the other) in some kernel interfaces associated with some system calls between the user space and the kernel space. In one implementation, the runtime execution unit 124 can determine whether a system call originating from a process running within the WPAR 120 needs to be run through the kernel compatibility layer 230 based on whether or not the base OS runtime execution interface 240 has set a flag in the process 250 for the corresponding command. If the flag is set, the system call bypasses the kernel compatibility layer 230, and instead the command is executed using the base OS environment via the base OS runtime execution interface 240. If the flag is not set, the system call goes through the kernel compatibility layer 230 to execute the command. The kernel compatibility layer 230 can modify the inbound system call to match the base OS version of the system call, and can also modify the outbound response to be compatible with the legacy OS version of the WPAR 120. For example, for some system calls, an additional parameter may have been added to the interface in the base OS environment. Therefore, when the system call is run, the runtime execution unit 124 can cause the kernel compatibility layer 230 to intercept the system call from the process running on the WPAR 120, and add the additional parameter that achieve the desired behavior the legacy OS is looking for, and then pass it to the base OS kernel 110.

Figure 3:
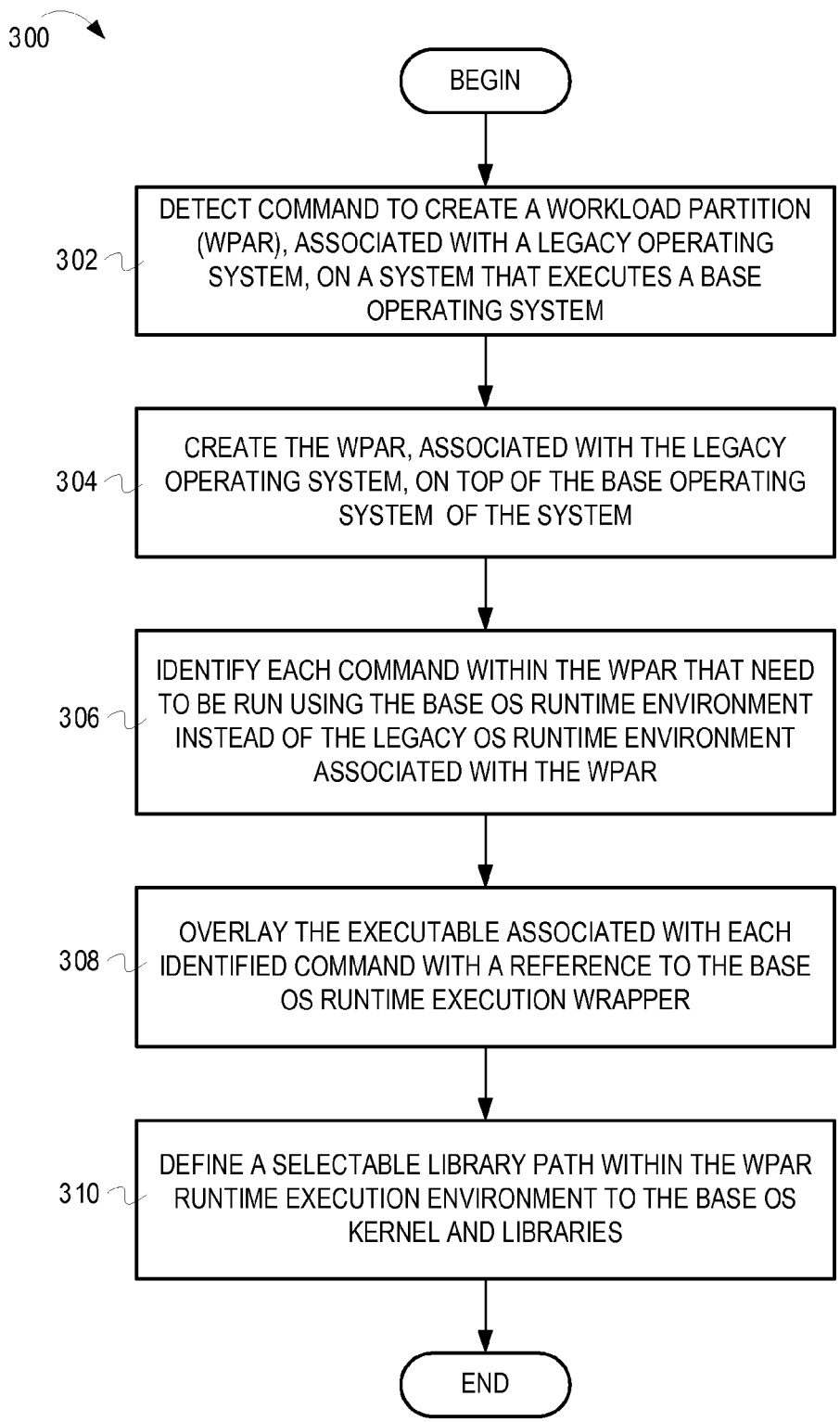
FIG. 3 depicts a flow diagram illustrating example operations for creating a WPAR, associated with an earlier version of the base OS, on a system that executes the base OS.

FIG. 3 depicts a flow diagram illustrating example operations for creating a WPAR, associated with an earlier version of the base OS, on a system that executes the base OS. The flow 300 will be described with reference to the example block diagrams of FIGS. 1-2. The flow 300 begins at block 302 in FIG. 3.

A command is detected to create a WPAR on the system 100 that is configured to execute the base OS 102 (block 302). For example, the WPAR management unit 111 detects a command (e.g., initiated by a system administrator) to create the WPAR 120, associated with the legacy OS (i.e. an earlier version of the base OS 102), on the system 100 (e.g., a single host computer system, or a single LPAR within a host computer system). The flow continues at block 304.

The WPAR, associated with the legacy OS, is created on top of the base OS 102 of the system 100 (block 304). For example, in response to detecting the command, the WPAR management unit 111 creates the WPAR 120 by creating a set of file systems and populating the set of file systems with the content of the legacy OS file system backup 105 to create a virtualized instance of the user space associated with the legacy OS. For example, the WPAR management unit 111 can create the virtualized runtime environment of the WPAR 120 by populating the file systems with the legacy OS libraries 125 and commands 122. The flow continues at block 306.

Each command 122 is identified within the WPAR 120 that needs to be executed using the base OS runtime environment instead of the legacy OS runtime environment associated with the WPAR 120 (block 306). For example, the WPAR management unit 111 identifies entries in the legacy OS file systems for each command 122 that needs to be executed using the base OS runtime environment. As was described above, most of the commands 122 in the legacy OS library 125 depend on kernel interfaces that do not change from one version of the operating system to the other. However, one or more of the commands 122 may have dependencies on the content of the base OS kernel 110, on interfaces from kernel extensions, and/or on other kernel-related information that does change from one version of the operating system to the other. In one example, the WPAR management unit 111 is programmed with the names (and/or other identifying information) of each command 122 that has the dependencies on the base OS kernel 110. The WPAR management unit 111 can access the file systems associated with the legacy OS environment to identify each command 122 based on the command names (and/or other identifying information). The flow continues at block 308.

The executable associated with each of the identified commands 122 (which have the dependencies on the base OS kernel 110) are overlaid with a reference to the base OS runtime execution wrapper 255 (block 308). In some embodiments, for each identified command 122 that needs to be executed using the base OS runtime environment, the WPAR management unit 111 can modify the corresponding entries in the legacy OS file systems by overlaying the executables associated with each identified command 122 with a symbolic link to the location of the base OS runtime execution wrapper 255. The symbolic link can be followed to the location of the base OS runtime execution wrapper 255 when attempting to execute each command 122, as will be further described below with reference to FIGS. 4-5. The flow continues at block 310.

A selectable base OS library path is defined within the WPAR runtime execution environment to the base OS kernel 110 and libraries 115 (block 310). The WPAR management unit 111 defines, within the WPAR runtime execution environment, the selectable base OS library path to the base OS kernel 110 and libraries 115. In one example, the WPAR management unit 111 can define a selectable directory path where the loader (e.g., of the runtime execution unit 124) can access the base OS kernel 110 and libraries 115 during execution. By defining this selectable base OS library path, the WPAR runtime execution environment can select either the legacy OS libraries 125 or the base OS libraries 115 during execution of a command. In one specific example, for a base AIX OS (e.g., version 7.1), the WPAR may select either a "/usr/lib" file system that can be used to access the legacy OS libraries (e.g., associated with AIX version 5.2), or a "/nre/usr/lib" file system that can be used to access the base OS libraries, as will be further described below. From block 310, the flow ends.

Figure 4:
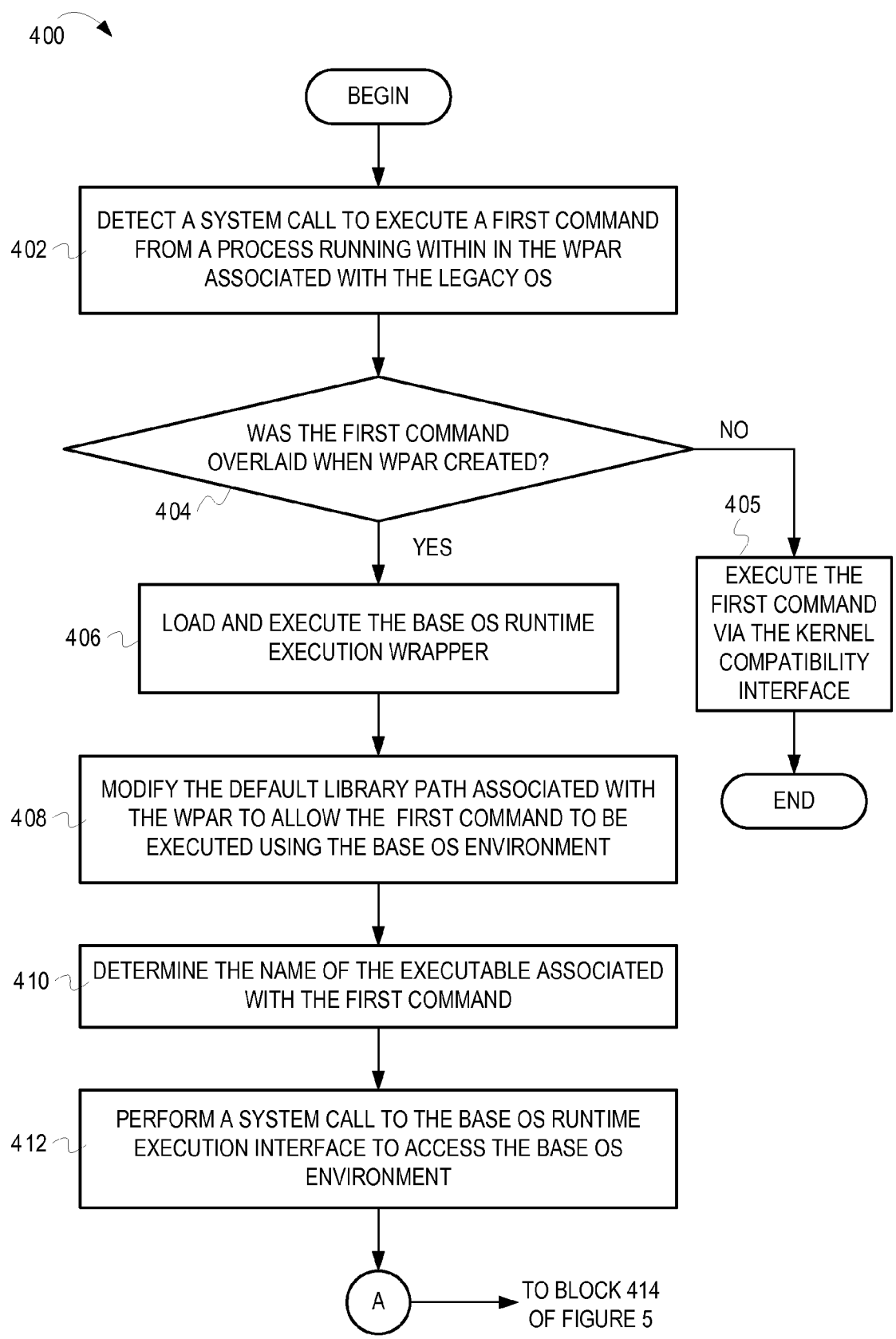
FIG. 4 depict a flow diagram illustrating example operations for executing a command called by a process running within a WPAR of a system running a different version of the operating system.
Figure 5:
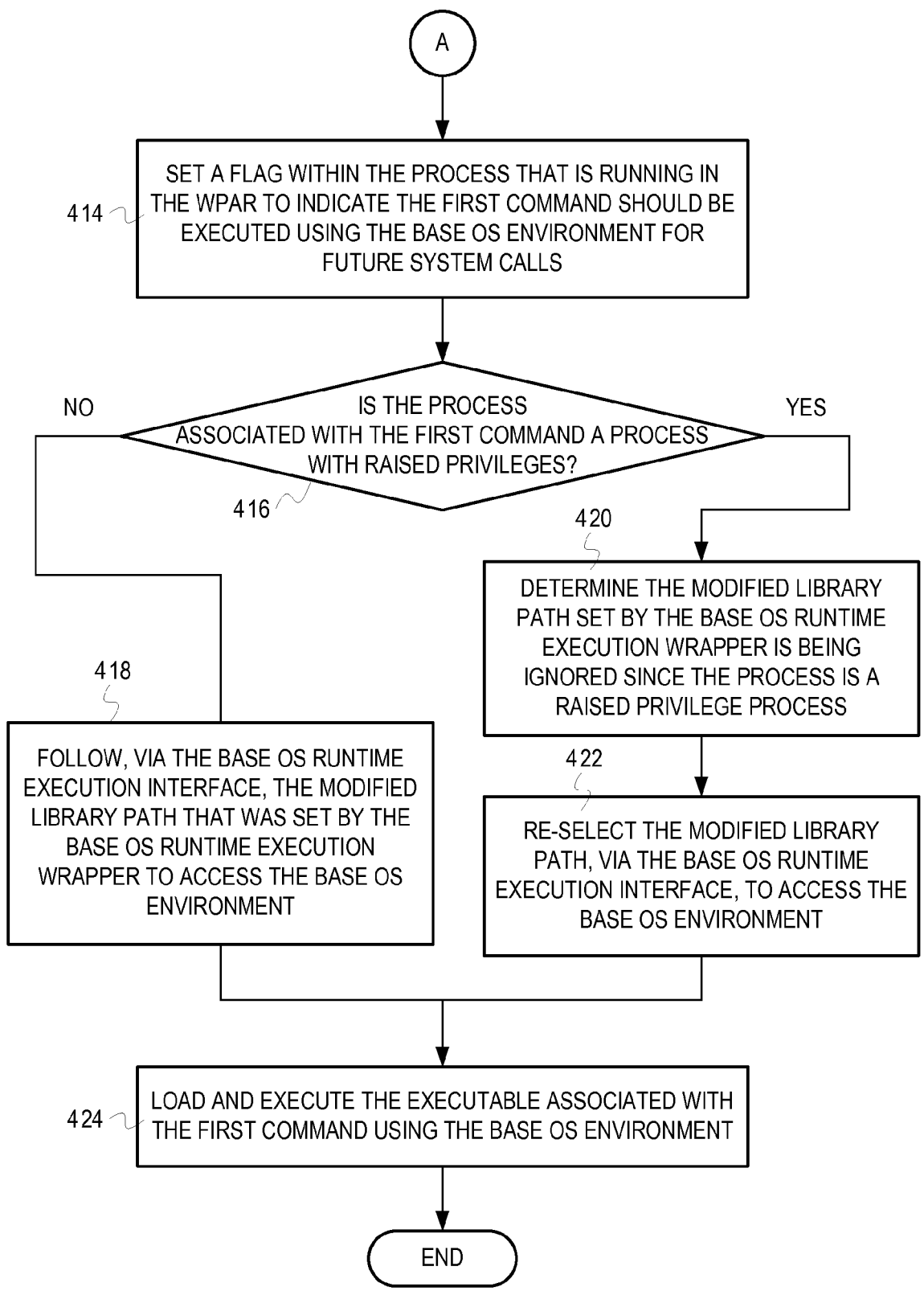
FIG. 5 is a continuation of FIG. 4 and also depicts the flow diagram illustrating example operations for executing a command called by a process running within a WPAR of a system running a different version of the operating system.

FIG. 4 and FIG. 5 depict a flow diagram illustrating example operations for executing a command called by a process running within a WPAR of a system running a different version of the operating system. The flow 400 will be described with reference to the example block diagrams of FIGS. 1-2. The flow 400 begins at block 402 in FIG. 4.

A system call to execute a command is detected from a process running within the WPAR 120 associated with the legacy OS (block 402). For example, the runtime execution unit 124 of the WPAR 120 can detect the system call from the process 250 to execute the first command 122. The flow continues at block 404.

It is determined whether the first command 122 was overlaid when the WPAR 120 was created in the system 100 (block 404). For example, the runtime execution unit 124 can access the entry corresponding to the first command 122 in the WPAR legacy OS file systems to determine whether the executable file associated with the first command 122 was overlaid when the WPAR 120 was created in the system 100. As described above, when the WPAR 120 is created, if the first command 122 has dependencies on the base OS kernel 110 (and therefore should be executed using the base OS environment), the WPAR management unit 111 overlays the executable file associated with the first command 122 with a symbolic link to the base OS runtime execution wrapper 255. In one implementation, the runtime execution unit 124 determines that the executable file associated with the first command 122 was overlaid and follows the symbolic link to load and execute the executable file associated with the base OS runtime execution wrapper 255. It is noted, however, that in another embodiment the runtime execution unit 124 may load and execute the base OS runtime execution wrapper 255 after detecting the system call, and determining that the first command 122 is one of a plurality of predefined commands 122 that need to be executed using the base OS environment. If it is determined that the first command 122 was overlaid when the WPAR 120 was created, the flow continues at block 406 where the base OS runtime execution wrapper 255 is executed. Otherwise, the flow continues at block 405, where the first command 122 is executed via the kernel compatibility layer 230.

If the first command 122 was not overlaid when the WPAR was created, the first command 122 is executed via the kernel compatibility layer (block 405). For example, as was described above in FIG. 2, the kernel compatibility layer 230 can resolve minor semantic and syntactic differences (from one version of the operation system to the other) that may been needed for execution of the first command 122.

If the first command 122 was overlaid when the WPAR was created, the base OS runtime execute wrapper 255 is loaded and executed (block 406). For example, the runtime execution unit 124 follows the symbolic link to the location of the base OS runtime execution wrapper and loads and executes the base OS runtime execution wrapper 255. The flow continues at block 408.

When the runtime execution unit 124 loads and executes the base OS runtime execution wrapper 255, the base OS runtime execution wrapper 255 modifies the default library path associated with the WPAR to allow the first command 122 to be executed using the base OS environment (e.g., the base OS kernel 110 and libraries 115) (block 408). For example, instead of following the default library path for execution (i.e., accessing the legacy OS libraries 125, loading the binary executable associated with the command, and executing the command), the base OS runtime execution wrapper 255 sets the selectable base OS library path, which was defined when the WPAR 120 was created, for accessing the base OS kernel 110 and libraries 115. In one implementation, the runtime execution unit 124 executing the base OS runtime execution wrapper 255 dynamically selects the selectable base OS library path (instead of the default library path) to execute the first command 122. For example, the base OS runtime execution wrapper 255 can select the base OS library path that the runtime execution unit 124 can follow to access base OS libraries 115 needed to execute the first command 122. In one specific example, for a base AIX OS (e.g., version 7.1), the WPAR can be defined (e.g., using a LIBPATH environment variable) with a default library path "/usr/lib" to a file system for accessing the legacy OS libraries (e.g., associated with AIX version 5.2), or a selectable base OS library path "/nre/usr/lib" to a file system for accessing the base OS libraries. In this example, the base OS libraries can be made available within the WPAR by mounting the file system from the base OS libraries as a native runtime environment ("nre"). The base OS runtime execution wrapper 255 can modify the default library path (and set the selectable execution path) via the LIBPATH environment variable by prepending the "/nre" (native runtime environment) library path before the "/usr/lib" (user level) default path. This sets the selectable base OS library path that was predefined when the WPAR 120 was created to access the base OS environment. The flow continues at block 410.

The base OS runtime execution wrapper 255 also determines the name of the executable associated with the first command 122 (block 410). The base OS runtime execution wrapper 255 provides the name of the executable associated with the first command 122 to the base OS runtime execution interface 240, so that the base OS runtime execution interface 240 can identify and access the corresponding command and other kernel-related information in the base OS environment. The flow continues at block 412.

Furthermore, the base OS runtime execution wrapper 255 performs a system call to the base OS runtime execution interface 240 (block 412). As described above, the base OS runtime execution interface 240 is a special type of system call that can be used to access the base OS environment (e.g., the base OS kernel 110 and libraries 115) to execute the first command 122, as will be described further below. The flow continues at block 414 of FIG. 5.

For future system calls, a flag is set within the process 250 that is running in the WPAR 120 to indicate the first command 122 should be executed using the base OS environment (block 414). In some embodiments, when the base OS runtime execution wrapper 255 calls the base OS runtime execution interface 240, the base OS runtime execution interface 240 immediately sets a flag (e.g., a bit or a parameter) or other type of indicator within the process 250 that is running within the WPAR 120 to indicate the first command 122 should be executed using the base OS environment (i.e., the base OS libraries 115 and not the kernel compatibility layer) in the future. The flow continues at block 416.

It is determined whether the process 250 associated with the first command 122 is a process with raised privileges (block 416). For example, when the base OS runtime execution wrapper 255 calls the base OS runtime execution interface 240, the base OS runtime execution interface 240 can determine whether the process 250 associated with the first command 122 is a process with raised privileges. A process with raised privileges may include a process, which usually requires root administrator privileges (or other higher level privilege) to execute, that is initiated by a user that does not have the higher level privileges. As will be further described below, for security purposes, the system performs additional operations for raised privilege processes. If the base OS runtime execution interface 240 determines that the process 250 is not a raised privilege process, the flow continues at block 418. Otherwise, the flow continues at block 420.

In response to determining that the process 250 is not a process with raised privileges, the modified library path (i.e., the base OS library path) that was set by the base OS runtime execution wrapper 255 is followed to access the base OS environment (block 418). For example, instead of the default library path, the base OS runtime execution interface 240 accesses the base OS file system to load the executable associated with the first command 122. The base OS runtime execution interface 240 uses the name associated with the first command 122 to find and load the executable associated with the first command 122 from the base OS file systems. In other words, the base OS file system will also include a file that is associated with the name of the first command 122, which includes an executable for the first command 122 in the base OS environment. The base OS runtime execution interface 240 then uses the selectable base OS library path that was set by the base OS runtime execution wrapper 255 to access the base OS libraries 115 for execution of the first command 122. The flow continues at block 424.

It is determined that the modified library path (i.e., the base OS library path) set by the base OS runtime execution wrapper 255 is being ignored because the process 250 is a process with raised privileges (block 420). For example, the base OS runtime execution interface 240 determines that the runtime execution unit 124 ignores the base OS library path that was set by the base OS runtime execution wrapper 255 because the process 250 is a process with raised privileges. For security purposes, the runtime execution unit 124 ignores the base OS library path (e.g., set via the LIBPATH variable) instead sets and follows the library path that is built-in to the executables. This security measure may be instituted so that processes that are running with raised privileges do not modify the library path to select libraries that could have been provided by the user to inject devious code that could cause damage to the system 100 (and possibly other related systems) due to the raised privileges. The flow continues at block 422.

The modified execution path is re-selected via the base OS runtime execution interface 240 to access the base OS environment. The base OS runtime execution interface 240 may be built with the same selectable library path to access the base OS environment. When the base OS runtime execution interface 240 determines that the process is a raised privilege process, the base OS runtime execution interface 240 automatically sets the selectable base OS library path (instead of possibly the library path to the legacy OS) to access the base OS environment during execution of the first command 122. The base OS runtime execution interface 240 uses the name associated with the first command 122 to find and load the executable associated with the first command 122 from the base OS file systems (e.g., from the base OS commands store 112). In other words, the base OS file system will also include a file that is associated with the name of the first command 122, which includes an executable for the first command 122 in the base OS environment. The base OS runtime execution interface 240 then uses the selectable base OS library path that was set by the base OS runtime execution wrapper 255 to access the base OS libraries 115 for execution of the first command 122. The flow continues at block 424.

The executables from the base OS file systems that are associated with the first command 122 are loaded and executed using the base OS environment. For example, the runtime execution unit 124 follows the modified execution path via the base OS runtime execution interface 240 to the base OS environment to load and execute the executables from the base OS files systems that are associated with the first command 122. The runtime execution unit 124 also loads the base OS libraries 115 needed to execute the first command 122. From block 424, the flow ends.

It should be understood that FIGS. 1-5 are examples meant to aid in understanding embodiments and should not be used to limit embodiments or limit scope of the claims. Embodiments may perform additional operations, fewer operations, operations in a different order, operations in parallel, and some operations differently. It is further noted that although FIGS. 1 and 2 illustrate example block diagrams showing the WPAR management unit 111 as a separate entity within the base OS 102, the functionality associated with the WPAR management unit 111 may be distributed across the base OS kernel 110. Also, although the runtime execution unit 124 is shown as part of the WPAR 120 in FIGS. 1 and 2, the functionality associated with the runtime execution unit 124 may be distributed across the WPAR 120, the base OS kernel 110, and also one or more processors and memory that are available to the system 100.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
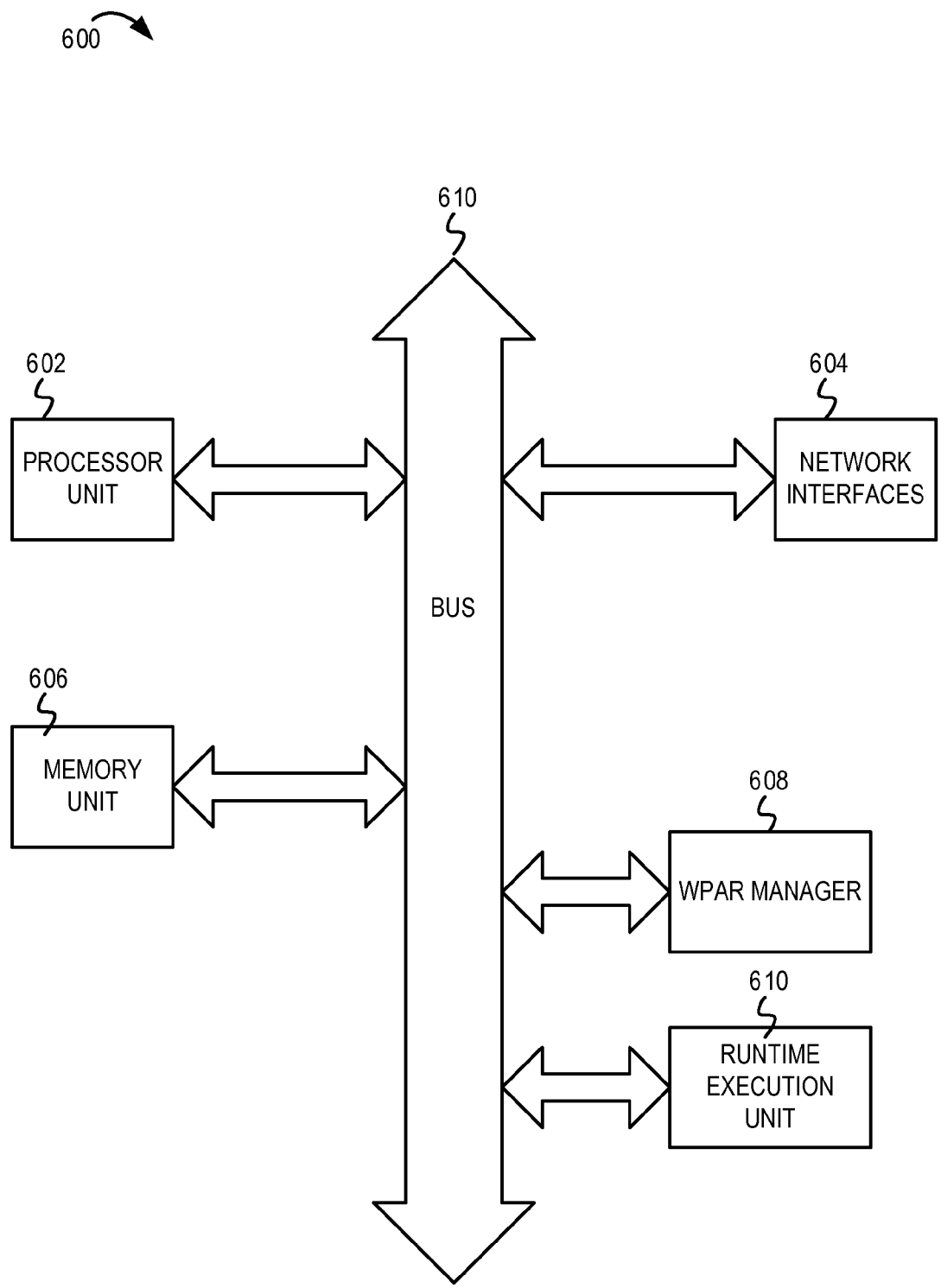
FIG. 6 is a block diagram of one embodiment of a computer system including a mechanism for implementing WPARs.

FIG. 6 is a block diagram of one embodiment of a computer system 600 including a mechanism for implementing WPARs. The computer system 600 includes a processor unit 602 (possibly including multiple processors, multiple cores, multiple nodes, and/or implementing multi-threading, etc.). The computer system 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 600 also includes a bus 610 (e.g., PCI, ISA, PCI-Express, HyperTransport®, Infini-Band®, NuBus, AHB, AXI, etc.), and network interfaces 604 that include at least one wireless network interface (e.g., a WLAN interface, a Bluetooth® interface, a WiMAX interface, a ZigBee® interface, a Wireless USB interface, etc.).

The computer system 600 also includes a WPAR management unit 608 that implements functionality to create a WPAR associated with an earlier version of the base OS that is executing on the computer system 600, as was described above with reference to FIGS. 1 and 3. The computer system 600 further implements a runtime execution unit 610 for establishing the correct library path and performing other operations for executing commands called by processes running within the WPARs, as was described above with reference to FIGS. 2 and 4-5.

In some embodiments, the computer system 600 can include additional devices and/or more than one of each component shown in FIG. 6 (e.g., video cards, audio cards, peripheral devices, etc.). For example, in some instances, the computer system 600 may include multiple processor units, multiple cores, multiple external CPU's. In other instances, components may be integrated or subdivided. Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.).

While the embodiments are described with reference to various implementations and exploitations, it will be understood that these embodiments are illustrative and that the scope of the inventive subject matter is not limited to them. In general, techniques for integrating a virtualized application runtime environment with a system running a different version of operating system as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter.

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
creating a workload partition, associated with a legacy operating system, on an instance of a base operating system implemented on a machine, wherein the legacy operating system is an earlier version of the base operating system, wherein the legacy operating system includes a plurality of legacy commands;
in response to determining that a first subset of the legacy commands has a dependency on content of the base operating system, overlaying the first subset of the legacy commands with a reference to a runtime execution wrapper associated with the base operating system, wherein a second subset of the legacy commands are not overlaid;
detecting an indication to execute a first command associated with a process of the workload partition associated with the legacy operating system;
in response to determining that the first command associated with the process of the workload partition associated with the legacy operating system was overlaid with the reference to the runtime execution wrapper associated with the base operating system, performing operations comprising:
executing the runtime execution wrapper to access a runtime execution environment associated with the base operating system, and executing the first command using the runtime execution environment associated with the base operating system; and
in response to determining that the first command was not overlaid with the reference to the runtime execution wrapper, executing the first command using the runtime execution environment associated with the legacy operating system;
in response to determining that the process of the workload partition is a raised privilege process, determining a modified library path set by the runtime execution wrapper is being ignored, and re-selecting the modified library path; and
in response to determining that the process of the workload partition is not the raised privilege process, following the modified library path.

2. The method of claim 1, wherein said creating the workload partition, associated with the legacy operating system, on the instance of the base operating system implemented on the machine further comprises:
identifying the plurality of commands, including the first command, from a runtime execution environment of the workload partition associated with the legacy operating system that are to be executed using the runtime execution environment associated with the base operating system; and
overlaying each of the plurality of commands, including the first command, with the reference to the runtime execution wrapper associated with the base operating system.

3. The method of claim 2, wherein said creating the workload partition, associated with the legacy operating system, on the instance of the base operating system implemented on the machine further comprises:

defining the modified library path to allow access to the runtime execution environment associated with the base operating system for executing the first command.

4. The method of claim 1, wherein said executing the runtime execution wrapper to access the runtime execution environment associated with the base operating system comprises:
modifying a default library path used to access a runtime execution environment of the workload partition associated with the legacy operating system to access to the runtime execution environment associated with the base operating system for executing the first command.

5. The method of claim 4, wherein said executing the runtime execution wrapper to access the runtime execution environment associated with the base operating system further comprises:
determining an identification information associated with the first command associated with the process of the workload partition associated with the legacy operating system; and
performing a system call to execute a runtime execution interface associated with the base operating system.

6. The method of claim 5, wherein said performing the system call to execute the runtime execution interface associated with the base operating system comprises:
setting an indication in the process of the workload partition associated with the legacy operating system indicating the first command is to be executed using the runtime execution environment associated with the base operating system for future system calls.

7. The method of claim 6, wherein said performing the system call to execute the runtime execution interface associated with the base operating system further comprises:
in response to determining the process is not the raised privilege process, utilizing the modified library path from the workload partition associated with the legacy operating system, that was selected by the runtime execution wrapper, to access the runtime execution environment associated with the base operating system for loading an executable file associated with the first command from the runtime execution environment associated with the base operating system and executing the executable file associated with first command; and
in response to determining the process is the raised privilege process,
determining the modified library path that was set by the runtime execution wrapper is being ignored; and
re-selecting the modified library path via the runtime execution interface associated with the base operating system to access the runtime execution environment associated with the base operating system for loading the executable file associated with the first command from the runtime execution environment associated with the base operating system and executing the executable file associated with first command.

8. The method of claim 5, wherein said executing the first command using the runtime execution environment associated with the base operating system comprises:
accessing the runtime execution environment associated with the base operating system;
utilizing the identification information associated with the first command to find an executable file associated with the first command within the runtime execution environment associated with the base operating system;
loading the executable file associated with the first command from the runtime execution environment associated with the base operating system; and
executing the executable file associated with the first command using the runtime execution environment associated with the base operating system.

9. The method of claim 1, wherein said determining that the first command from the workload partition associated with the legacy operating system was overlaid with the reference to the runtime execution wrapper associated with the base operating system comprises:
accessing an entry associated with the first command in a file system of the workload partition associated with the legacy operating system; and
determining that an executable file associated with the first command that was stored in the entry in the file system of the workload partition associated with the legacy operating system was overlaid with a symbolic link to the runtime execution wrapper associated with the base operating system.

10. The method of claim 1, further comprising:
detecting an indication to execute a second command associated with a second process of the workload partition associated with the legacy operating system;
determining that the second command associated with the second process of the workload partition associated with the legacy operating system was not overlaid with the reference to the runtime execution wrapper associated with the base operating system;
loading an executable file associated with the second command from a runtime execution environment of the workload partition associated with the legacy operating system; and
executing the executable file associated with the second command using the runtime execution environment associated with the legacy operating system and a kernel compatibility layer associated with the base operating system.

11. The method of claim 1, wherein said creating the workload partition, associated with the legacy operating system, on the instance of the base operating system implemented on the machine comprises creating the workload partition, associated with the legacy operating system, on the instance of the base operating system implemented on a host computer system or on a logical partition of the host computer system.

12. A computer program product for implementing a workload partition, the computer program product comprising:
a computer readable storage medium having computer usable program code embodied therewith, the computer readable program code configured to,
create the workload partition, associated with a legacy operating system, on an instance of a base operating system, wherein the legacy operating system is an earlier version of the base operating system, wherein the legacy operating system includes a plurality of legacy commands;
in response to a determination that a first subset of the legacy commands has a dependency on content of the base operating system, overlay the first subset of the legacy commands with a reference to a runtime execution wrapper associated with the base operating system, wherein a second subset of the legacy commands are not overlaid;
detect an indication to execute a first command associated with a process of the workload partition associated with the legacy operating system;
in response to a determination that the first command associated with the process of the workload partition associated with the legacy operating system was overlaid with the reference to the runtime execution wrapper associated with the base operating system, perform operations comprising:
  execute the runtime execution wrapper to access a runtime execution environment associated with the base operating system, and
  execute the first command using the runtime execution environment associated with the base operating system; and
in response to a determination that the first command was not overlaid with the reference to the runtime execution wrapper, execute the first command using the runtime execution environment associated with the legacy operating system;
in response to a determination that the process of the workload partition is a raised privilege process, determine a modified library path set by the runtime execution wrapper is being ignored, and re-select the modified library path; and
in response to a determination that the process of the workload partition is not the raised privilege process, follow the modified library path.

13. The computer program product of claim 12, wherein the computer readable program code configured to create the workload partition, associated with the legacy operating system, on the instance of the base operating system implemented on the machine further comprises the computer readable program code configured to:
  identify the plurality of commands, including the first command, from a runtime execution environment of the workload partition associated with the legacy operating system that are to be executed using the runtime execution environment associated with the base operating system; and
  overlay each of the plurality of commands, including the first command, with the reference to the runtime execution wrapper associated with the base operating system.

14. The computer program product of claim 12, wherein the computer readable program code configured to execute the runtime execution wrapper to access the runtime execution environment associated with the base operating system comprises the computer readable program code configured to:
  modify a default library path used to access a runtime execution environment of the workload partition associated with the legacy operating system to access to the runtime execution environment associated with the base operating system for executing the first command;
  determine an identification information associated with the first command associated with the process of the workload partition associated with the legacy operating system; and
  perform a system call to execute a runtime execution interface associated with the base operating system.

15. The computer program product of claim 14, wherein the computer readable program code configured to perform the system call to execute the runtime execution interface associated with the base operating system comprises the computer readable program code configured to:
  set an indication in the process of the workload partition associated with the legacy operating system indicating the first command is to be executed using the runtime execution environment associated with the base operating system for future system calls;
  in response to determining the process is not the raised privilege process, utilize the modified library path from the workload partition associated with the legacy operating system, that was selected by the runtime execution wrapper, to access the runtime execution environment associated with the base operating system for loading an executable file associated with the first command from the runtime execution environment associated with the base operating system and executing the executable file associated with first command; and
  in response to determining the process is the raised privilege process,
    determine the modified library path that was set by the runtime execution wrapper is being ignored; and
    re-select the modified library path via the runtime execution interface associated with the base operating system to access the runtime execution environment associated with the base operating system for loading the executable file associated with the first command from the runtime execution environment associated with the base operating system and executing the executable file associated with first command.

16. The computer program product of claim 14, wherein the computer readable program code configured to execute the first command using the runtime execution environment associated with the base operating system comprises the computer readable program code configured to:
  access the runtime execution environment associated with the base operating system;
  utilize the identification information associated with the first command to find an executable file associated with the first command within the runtime execution environment associated with the base operating system;
  load the executable file associated with the first command from the runtime execution environment associated with the base operating system; and
  execute the executable file associated with the first command using the runtime execution environment associated with the base operating system.

17. An apparatus comprising:
a processor; and
a computer readable storage medium having computer usable program code embodied therewith, the computer readable program code configured to,
  create the workload partition, associated with a legacy operating system, on an instance of a base operating system, wherein the legacy operating system is an earlier version of the base operating system, wherein the legacy operating system includes a plurality of legacy commands;
  in response to a determination that a first subset of the legacy commands has a dependency on content of the base operating system, overlay the first subset of the legacy commands with a reference to a runtime execution wrapper associated with the base operating system, wherein a second subset of the legacy commands are not overlaid;
  detect an indication to execute a first command associated with a process of the workload partition associated with the legacy operating system;
  in response to a determination that the first command associated with the process of the workload partition associated with the legacy operating system was overlaid with the reference to the runtime execution wrapper associated with the base operating system, perform operations comprising:
    execute the runtime execution wrapper to access a runtime execution environment associated with the base operating system, and execute the first command using the runtime execution environment associated with the base operating system; and in response to a determination that the first command was not overlaid with the reference to the runtime execution wrapper, execute the first command using the runtime execution environment associated with the legacy operating system;

in response to a determination that the process of the workload partition is a raised privilege process, determine a modified library path set by the runtime execution wrapper is being ignored, and re-select the modified library path; and in response to a determination that the process of the workload partition is not the raised privilege process, follow the modified library path.

18. The apparatus of claim 17, wherein the computer readable program code configured to create the workload partition, associated with the legacy operating system, on the instance of the base operating system further comprises the computer readable program code configured to:

identify the plurality of commands, including the first command, from a runtime execution environment of the workload partition associated with the legacy operating system that are to be executed using the runtime execution environment associated with the base operating system; and overlay each of the plurality of commands, including the first command, with the reference to the runtime execution wrapper associated with the base operating system.

19. The apparatus of claim 17, wherein the computer readable program code configured to execute the runtime execution wrapper to access the runtime execution environment associated with the base operating system comprises the computer readable program code configured to:

modify a default library path used to access a runtime execution environment of the workload partition associated with the legacy operating system to access to the runtime execution environment associated with the base operating system for executing the first command;

determine an identification information associated with the first command associated with the process of the workload partition associated with the legacy operating system; and perform a system call to execute a runtime execution interface associated with the base operating system.

20. The apparatus of claim 17, wherein the computer readable program code configured to perform the system call to execute the runtime execution interface associated with the base operating system comprises the computer readable program code configured to:

set an indication in the process of the workload partition associated with the legacy operating system indicating the first command is to be executed using the runtime execution environment associated with the base operating system for future system calls;

in response to determining the process is not the raised privilege process, utilize the modified library path from the workload partition associated with the legacy operating system, that was selected by the runtime execution wrapper, to access the runtime execution environment associated with the base operating system for loading an executable file associated with the first command from the runtime execution environment associated with the base operating system and executing the executable file associated with first command; and in response to determining the process is the raised privilege process, determine the modified library path that was set by the runtime execution wrapper is being ignored; and re-select the modified library path via the runtime execution interface associated with the base operating system to access the runtime execution environment associated with the base operating system for loading the executable file associated with the first command from the runtime execution environment associated with the base operating system and executing the executable file associated with first command.

* * * * *